(12) United States Patent
Dixon et al.

(10) Patent No.: US 8,312,865 B2
(45) Date of Patent: Nov. 20, 2012

(54) EMISSION REDUCTION RETROFIT METHOD AND KIT FOR EMD TWO-CYCLE DIESEL ENGINES

(75) Inventors: James S. Dixon, Naples, FL (US); Gregory Lee Schultz, Naples, FL (US); Keith Mulder, Naples, FL (US); Edward A Schlairet, Guyton, GA (US)

(73) Assignee: Haynes Corporation, Naples, FL (US)

( * ) Notice: Subject to any disclaimer, the term of this patent is extended or adjusted under 35 U.S.C. 154(b) by 0 days.

(21) Appl. No.: 12/496,219

(22) Filed: Jul. 1, 2009

(65) Prior Publication Data

US 2010/0258087 A1 Oct. 14, 2010

(51) Int. Cl.
*F02M 61/14* (2006.01)
(52) U.S. Cl. ........................................ 123/470; 123/469
(58) Field of Classification Search .................. 123/469, 123/468, 470
See application file for complete search history.

(56) References Cited

U.S. PATENT DOCUMENTS

| | | | | |
|---|---|---|---|---|
| 3,402,703 A | * | 9/1968 | Dickerson et al. | 123/469 |
| 3,916,865 A | * | 11/1975 | Kiencke et al. | 123/198 DB |
| 4,275,693 A | * | 6/1981 | Leckie | 123/447 |
| 4,796,577 A | * | 1/1989 | Baranescu | 123/300 |
| 5,325,834 A | * | 7/1994 | Ballheimer et al. | 123/446 |
| 5,394,851 A | * | 3/1995 | Cryer et al. | 123/476 |
| 5,775,302 A | * | 7/1998 | Guido et al. | 123/468 |
| 6,158,218 A | * | 12/2000 | Herold et al. | 60/609 |
| 6,158,416 A | * | 12/2000 | Chen et al. | 123/380 |
| 6,325,050 B1 | | 12/2001 | Gallagher et al. | |
| 6,405,705 B1 | | 6/2002 | Dunsworth et al. | |
| 6,467,452 B1 | * | 10/2002 | Duffy et al. | 123/299 |
| 6,604,512 B2 | * | 8/2003 | Kato | 123/509 |
| 6,814,060 B1 | | 11/2004 | Solomons et al. | |
| 6,866,082 B1 | | 3/2005 | Zahner | |
| 7,073,481 B2 | * | 7/2006 | Glenn et al. | 123/305 |
| 7,370,627 B2 | * | 5/2008 | Mahakul et al. | 123/276 |
| 2001/0044352 A1 | * | 11/2001 | Korenjak et al. | 474/101 |
| 2006/0096273 A1 | | 5/2006 | Soliman et al. | |
| 2011/0030656 A1 | * | 2/2011 | Pepperine et al. | 123/470 |

FOREIGN PATENT DOCUMENTS

JP 59-101564 A * 6/1984

OTHER PUBLICATIONS

Jensen, Scott, "A Retrofit System to Convert a Locomotive to Nautal Gas Operation", 1994, ASME, Energy Conversions Inc. Tacoma, WA, http://www.energyconversions.com/pubs.htm.*
Odysseus, "Complete Common Rail Systms", 2009.*
Edelbrock, Table of Contents, 2008, Edelbrock, Brochure No. 63-35000 p. 2: Primary Kit Components.*
Edelbrock, Engine Control and Data Systems, 2008, Edelbrock Corporation, Brochure No. 635100, All Pages.*
James Seaton, EMD NOx Reduction 645E Engine Overhaul Kit, Jul. 2009, Electro-Motive Diesels Inc., All pages.*
Notice of Allowance and Fee(s) Due and Notice of Allowability for U.S. Appl. No. 12/622,815 which is a CIP of U.S. Appl. No. 12/496,219.

* cited by examiner

*Primary Examiner* — Stephen K Cronin
*Assistant Examiner* — Raza Najmuddin
(74) *Attorney, Agent, or Firm* — Porter Wright Morris & Arthur, LLP

(57) ABSTRACT

A method for retrofitting an existing EMD 567/645 two-cycle diesel engine to reduce exhaust emissions includes the steps of removing mechanical fuel injectors and associated components and installing of electronic unit fuel injectors and associated components. Also disclosed is a kit for retrofitting an existing EMD 567/645 two-cycle diesel engine to reduce exhaust emissions.

17 Claims, 13 Drawing Sheets

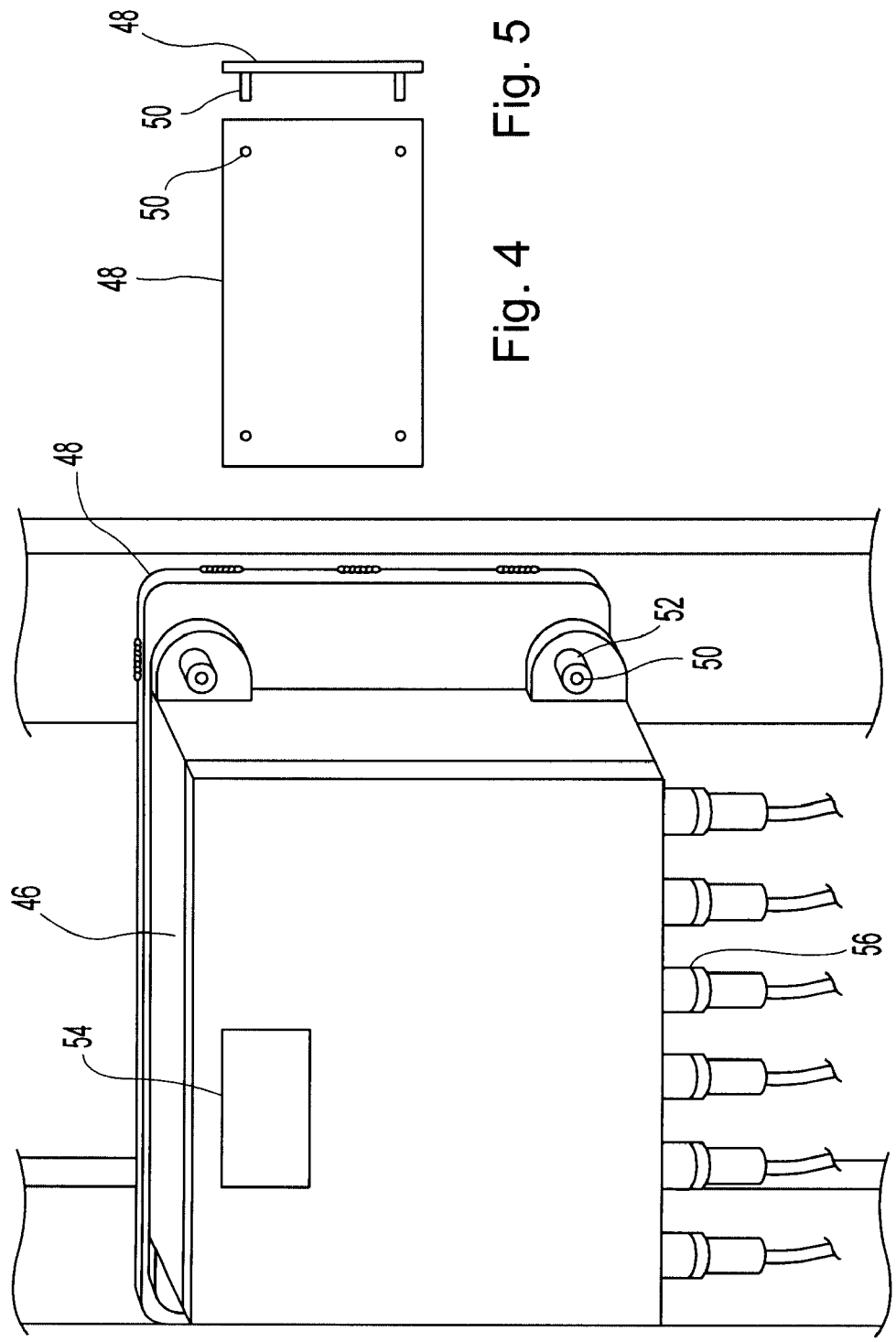

EMISSION REDUCTION RETROFIT METHOD AND KIT FOR EMD TWO-CYCLE DIESEL ENGINES

CROSS-REFERENCE TO RELATED APPLICATIONS

Not Applicable

STATEMENT REGARDING FEDERALLY SPONSORED RESEARCH

Not Applicable

REFERENCE TO APPENDIX

Not Applicable

FIELD OF THE INVENTION

The field of the present invention generally relates to two-cycle diesel engines produced by the Electro-Motive Division (EMD) of General Motors Corporation and, more particularly, to emission reduction for such engines.

BACKGROUND OF THE INVENTION

As part of the U.S. Environmental Protection Agency's (US EPA) ongoing National Clean Diesel Campaign, the EPA has adopted new standards that dramatically reduce emissions of nitrogen oxide ($NO_X$), diesel particulate matter (PM), unburned hydrocarbon (HC), and carbon monoxide (CO) from locomotive and marine diesel engines. Engines produced from 2005 to 2010 must meet US EPA Tier 2 standards, while engines produced from 2011 to 2014 must meet US EPA Tier 3 standards and engines produced from 2015 and beyond must meet US EPA Tier 4 standards. It is noted that engines produced prior to 1973 were uncontrolled while engines produced from 1973 to 2001 were required to meet US EPA Tier 0 standards and engines produced from 2002 to 2004 were required to meet US EPA Tier 1 standards.

While these EPA standards primarily relate to new and remanufactured engines, there is increasing pressure to reduce emissions of all existing non-road diesel engines. Eventually, all existing locomotive engines produced prior to 1973 must meet the US EPA Tier 0 standards and potentially even lower emission levels. For locomotives operating in specific emissions-regulated locations including California and Texas, emission levels must be reduced further with agreements to encourage the use of engines that meet the US EPA Tier 2 standards.

EMD produced more than 70,000 engines and has the largest installed base of diesel-electric locomotives in both North America and internationally. Among the two-cycle diesel engines produced by EMD are the EMD 567 series which was produced from 1938 until 1966 and the EMD 645 series which was produced from 1965 until 1988. The EMD 567/645 engines can be used for long periods of time due to their ability to be repeatedly repaired/overhauled and the high cost of newly purchased engines.

There is a large population of EMD 567/645 engines in service that have not reached the end of their useful life—a unique feature of this engine segment compared to smaller engine models. Some existing engines may exceed fifty years of age. Because of the emission standards, however, the owners of these EMD 567/645 engines are faced with the option of either overhauling or rebuilding the engines to meet the newer emission standards or retiring the engines early and purchasing new technology engines that meet the current emission standards. As a result, the owners of these engines stand to incur a heavy financial loss. Accordingly, there is a need for a cost effective system and method for extending the useful life of these two-cycle diesel engines without requiring an expensive overhaul or new replacement engine.

SUMMARY OF THE INVENTION

The present invention provides a pedal assembly which overcomes at least some of the above-noted problems of the related art. Disclosed is a kit for reducing exhaust emissions from an existing EMD 567/645 two-cycle diesel engine by retrofitting the engine from mechanical fuel injection to electronic fuel injection. The kit comprises a plurality of electronic unit fuel injectors and an electronic control module to be electrically connected to the electronic unit fuel injectors for delivering electronic injection signals to the electronic unit fuel injectors. The electronic control module is programmed for operating the electronic unit fuel injectors to improve emissions performance of the EMD 567/645 two cycle diesel engine.

Also disclosed is a method for retrofitting an EMD 567/645 two-cycle diesel engine to reduce exhaust emissions comprising the steps of removing a mechanical governor, rack, and associated linkage from the engine, removing mechanical fuel injectors from the engine, removing an over speed trip linkage and lay shaft assembly from the engine, removing a governor angle drive housing from the engine, removing a mechanical load regulator, installing an engine electronic control module, installing a plurality of electronic unit fuel injectors on the engine, connecting fuel lines of the electronic unit fuel injectors to a fuel supply/return of the engine, and installing the fuel injector wiring harness of the electronic unit fuel injectors to electrically connect the electronic fuel injectors to the electronic control unit.

Further disclosed is a method for retrofitting an EMD 567/645 two-cycle diesel engine to reduce exhaust emissions comprising the steps of removing a mechanical governor, rack, and associated linkage from the engine, removing mechanical fuel injectors from the engine, removing an over speed trip linkage and lay shaft assembly from the engine, removing a governor angle drive housing from the engine, removing a mechanical load regulator, installing an engine electronic control module, installing an engine governor control module, installing a plurality of electronic unit fuel injectors on the engine, connecting fuel lines of the electronic unit fuel injectors to a fuel supply/return of the engine, installing gear speed sensors on the engine, installing a lubrication oil pressure sensor on the engine, installing a coolant temperature sensor on the engine, installing an absolute pressure sensor on the engine, and installing a fuel injector wiring harness of the electronic unit fuel injectors to electrically connect the electronic unit fuel injectors to the electronic control unit.

From the foregoing disclosure and the following more detailed description of various preferred embodiments it will be apparent to those skilled in the art that the present invention provides a significant advance in the technology and art of two-cycle diesel engines. Particularly significant in this regard is the potential the invention affords for providing a cost effective system and method for extending the useful life of two-cycle diesel engines without requiring an expensive overhaul or new replacement engine. Additional features and advantages of various preferred embodiments will be better understood in view of the detailed description provided below.

BRIEF DESCRIPTION OF THE DRAWINGS

These and further features of the present invention will be apparent with reference to the following description and drawings, wherein:

FIG. 3 is a fragmented, perspective view of an electronic control module of the retrofitted engine of FIG. 2;

FIG. 4 is a front elevation view of a mounting plate for the electronic control module of FIG. 3;

FIG. 5 is a side elevational view of the mounting plate of FIG. 4;

Figure 1:
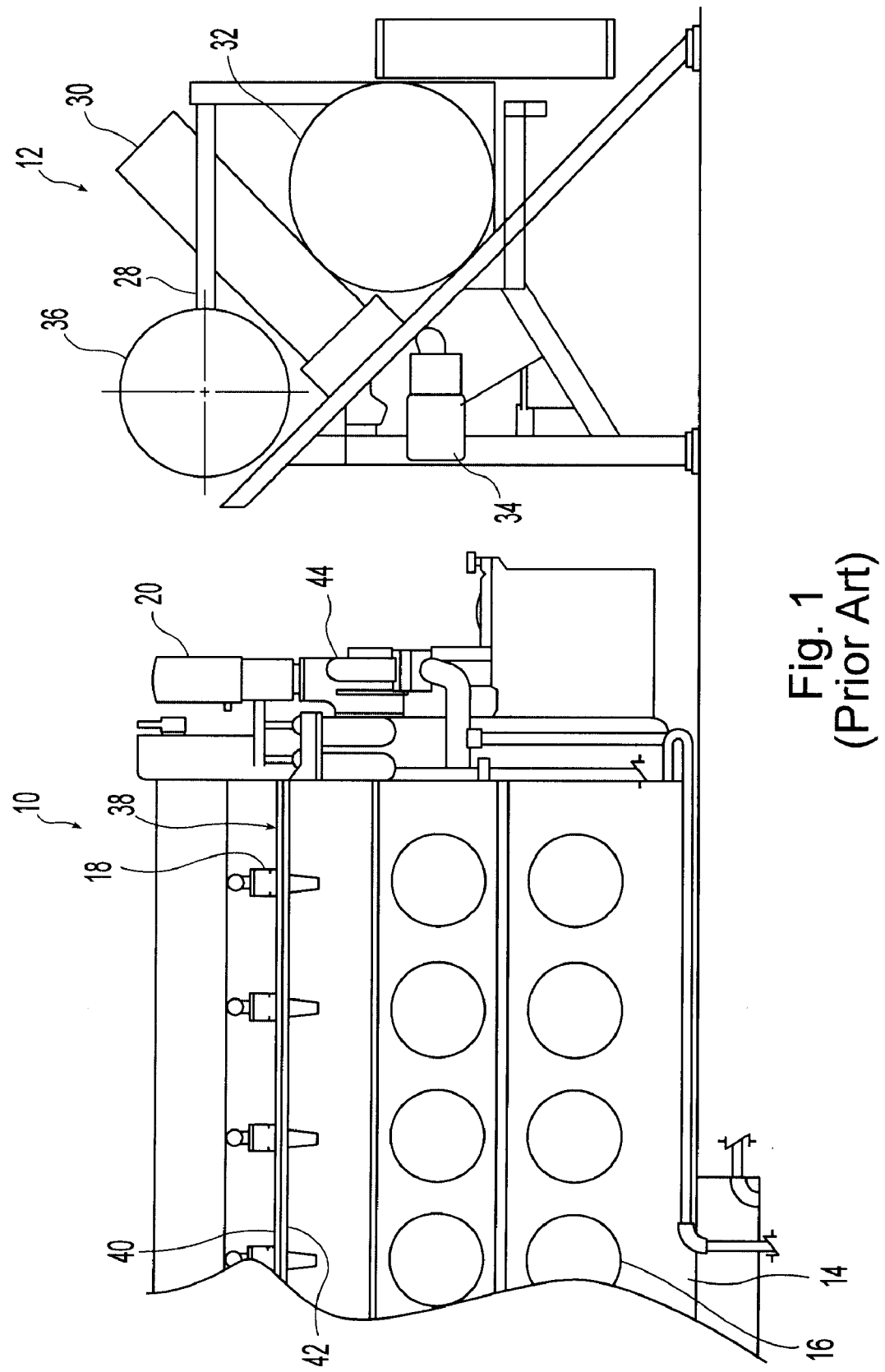
FIG. 1 is a diagrammatic view of a two-cycle diesel engine having a mechanical fuel injection system.

It should be understood that the appended drawings are not necessarily to scale, presenting a somewhat simplified representation of various preferred features illustrative of the basic principles of the invention. The specific design features of retrofitted two-cycle diesel engines as disclosed herein, including, for example, specific dimensions, orientations, locations, and shapes of the various components, will be determined in part by the particular intended application and use environment. Certain features of the illustrated embodiments have been enlarged or distorted relative to others to facilitate visualization and clear understanding. In particular, thin features may be thickened, for example, for clarity or illustration. All references to direction and position, unless otherwise indicated, refer to the orientation of the adjustable control pedal assemblies illustrated in the drawings. In general, up or upward refers to an upward direction within the plane of the paper in FIG. 1 and down or downward refers to a downward direction within the plane of the paper in FIG. 1.

DETAILED DESCRIPTION OF CERTAIN PREFERRED EMBODIMENTS

It will be apparent to those skilled in the art, that is, to those who have knowledge or experience in this area of technology, that many uses and design variations are possible for the improved systems and methods disclosed herein. The following detailed discussion of various alternative and preferred embodiments will illustrate the general principles of the invention with reference to an EMD 16-645E Roots-blown engine. Other embodiments suitable for other applications will be apparent to those skilled in the art given the benefit of this disclosure.

Referring now to the drawings, FIG. 1 shows an existing or in-use two-cycle mechanically-injected diesel engine 10 having and an associated equipment rack 12 which supports a collection of components that serve the engine 10. The illustrated engine 10 is an EMD 16-645E Roots-blown engine but it is noted that any other EMD 547/645 two-cycle mechanically-injected diesel engine can be retrofitted according to the present invention. The term "retrofit" is used in this specification and the claims to mean the modification of an engine in its place of use without removal as required for an overhaul or rebuild.

The illustrated engine 10 has an engine block 14 with sixteen cylinders—two rows of four cylinders 16 on each side. The illustrated engine 10 includes mechanical fuel injectors 18 for injecting fuel into the cylinders 16, a mechanical governor 20 for controlling the fuel flow from the mechanical fuel injectors 20, a rack and associated linkage 22 connecting the governor 20 to the mechanical fuel injectors 18, an over speed trip linkage and lay shaft assembly 24 for controlling the rack 22 of the fuel injectors 18, and a mechanical load regulator assembly 26 for setting a governor excitation voltage.

The illustrated equipment rack 12 includes a support structure 28, a lubrication oil cooler 30 supported by the structure 28, a lubrication oil filter 32 supported by the structure 28, a fuel pump 34 supported by the structure 28, and an engine coolant expansion tank 36 supported by the structure 28. Lubrication oil flows from an oil pan of the engine 10 through a strainer on the engine block 14 to the filter 32 on the equipment rack 12. From the filter 32, the oil flows to the oil cooler 30 and then to a pressure side of the strainer housing on the engine 10 where it is forced back into the engine 10 by a pressure pump. The fuel pump 34 on the equipment rack 12 selectively pumps fuel from a fuel supply tank to a manifold assembly 38 on the engine 10 which distributes the fuel to the mechanical fuel injectors 18. A fuel filter is preferably provided at the fuel pump 34. A fuel supply line 40 connects the fuel pump 34 to the manifold assembly 38. A fuel return line 42 connects the manifold assembly 38 to the fuel supply tank to return residual fuel in the manifold 38. The engine coolant expansion tank 36 is part of an engine cooling system which includes coolant manifolds on the engine 10 for cooling the engine cylinders 16 during operation. Coolant is pumped from the expansion tank 36 to the manifold and back by engine 10 mounted water pumps. The expansion tank 36 typically includes a sight glass, a filler and pressure cap, and a low coolant level switch.

Figure 1A:
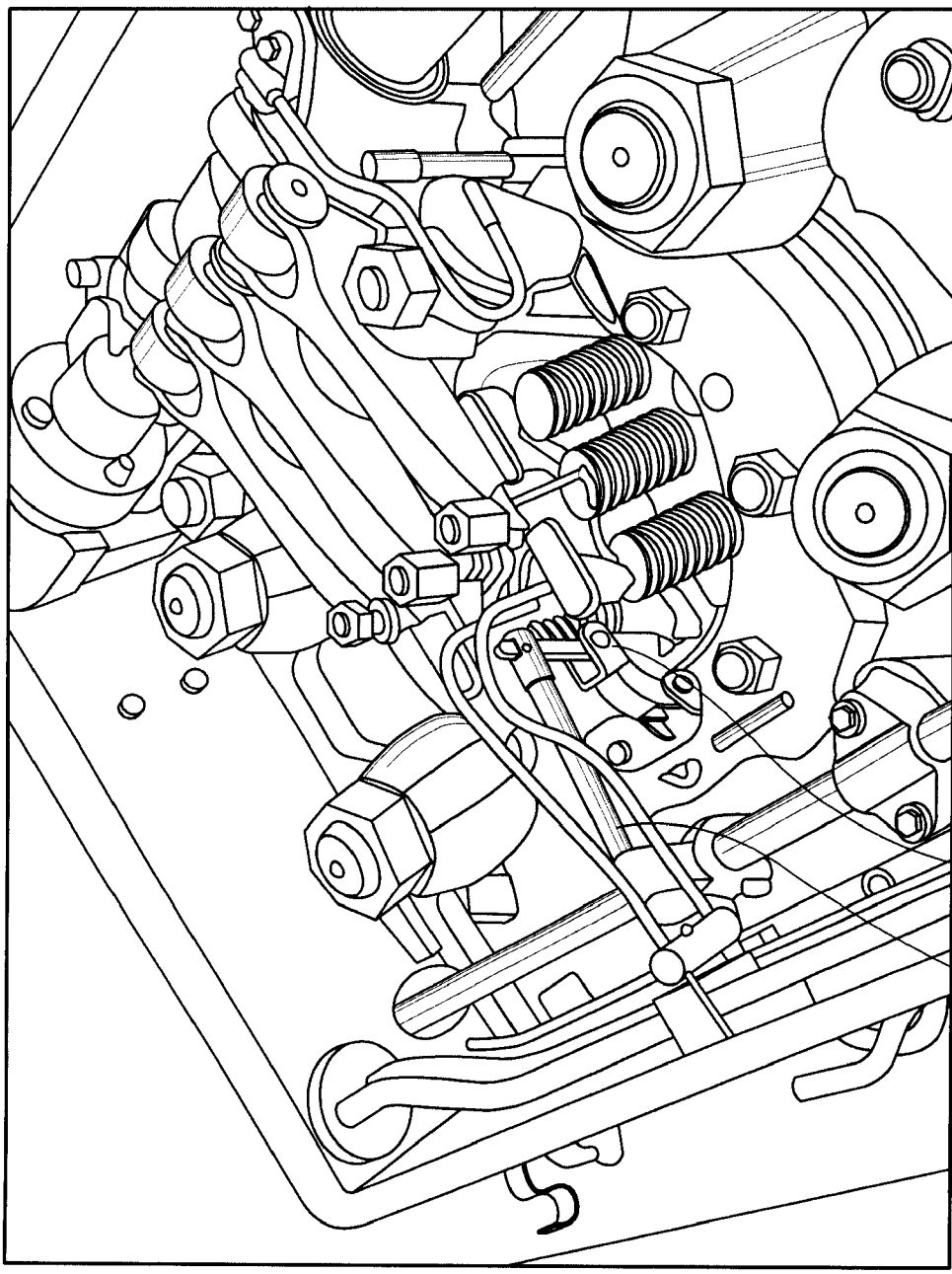
FIG. 1A is a perspective view showing mechanical control components of the engine of FIG. 1.
Figure 1B:
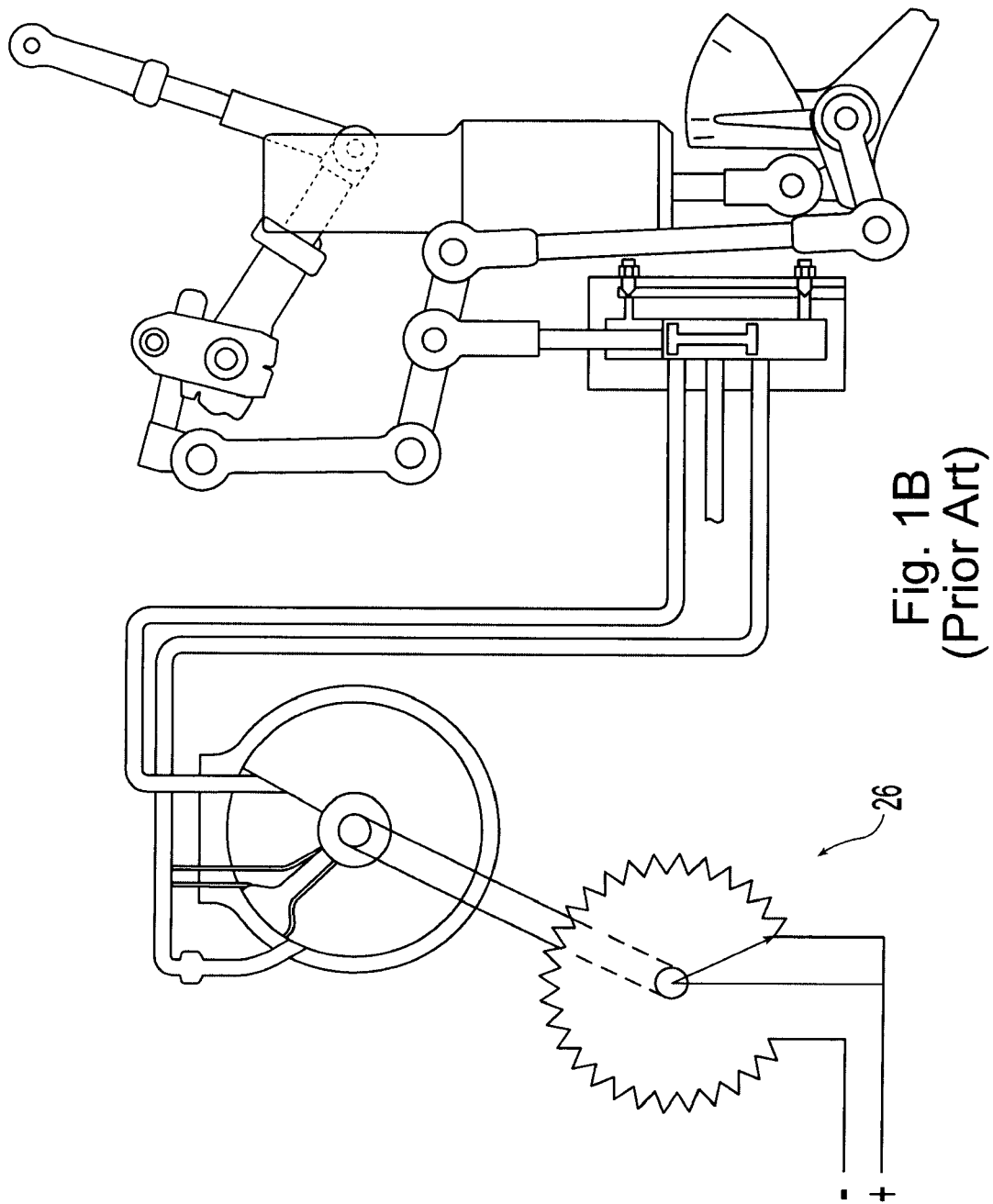
FIG. 1B is a diagrammatic view of a load regulator of the engine of FIG. 1.
Figure 2:
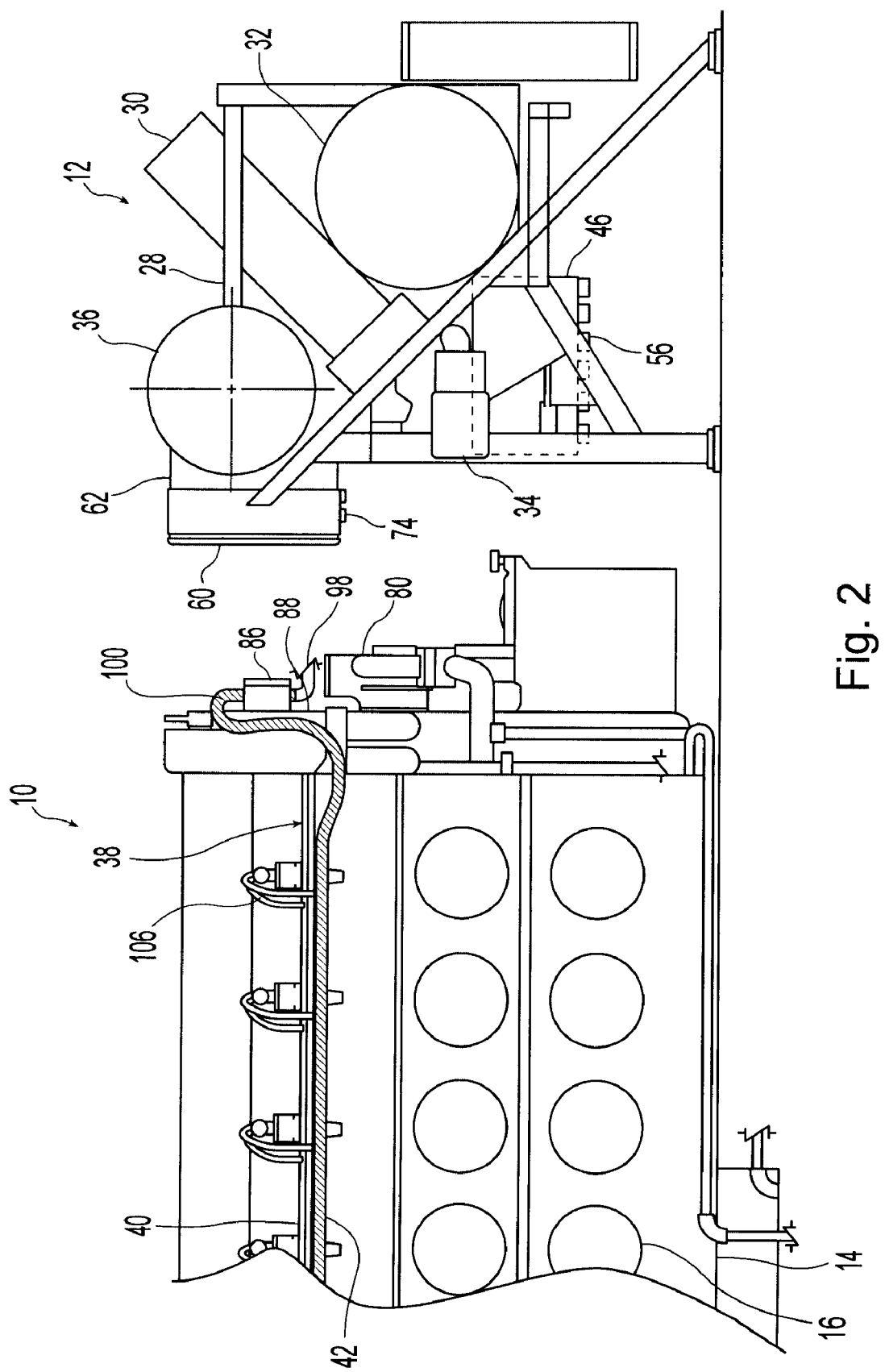
FIG. 2 is a diagrammatic view of the two-cycle diesel engine of FIG. 1 after it has been retrofitted with an electronic fuel injection system according to the present invention.

FIG. 2 shows the two-cycle mechanically-injected diesel engine 10 of FIG. 1 retrofitted to a two-cycle electronically-injected diesel engine according to the system and method of the present invention. The retrofit method includes the steps of removing the mechanical governor 20, the rack and associated linkage 22, the mechanical fuel injectors 18, the over speed trip linkage and lay shaft assembly 24, and the mechanical load regulator 26 from the engine (best shown in FIGS. 1, 1A, and 1B). A governor angle drive housing 44 is also removed from the engine 10.

As best shown in FIG. 3, a controller or electronic control module 46 is secured to the equipment rack 12. The illustrated controller 46 is installed on the left side (the coolant tank sight glass side) of the equipment rack 12. To secure the illustrated controller 46 to the equipment rack 12, a mounting plate 48 substantially the same size as the controller 46 is welded to the support structure 12. The controller 46 is then attached to the mounting plate 48. The illustrated mounting plate 48 is a planar rectangular plate with four threaded studs 50 (best shown in FIGS. 4 and 5). The mounting plate 48 can be, for example, a 0.25 inch thick steel plate. The threaded studs 48 extend through mounting lugs of the controller 46 and cooperate with threaded nuts 52 for removably attaching the controller 46 to the mounting plate 48 fixed to the equipment rack 12. It is noted that any other suitable attachment means can alternatively be utilized. The illustrated controller 46 has user interface controls 54 located so that they are clearly visible from the walkway between the engine 10 and the equipment rack 12. The illustrated controller 46 is provided with electric connectors 56 facing in a downward direction for ease of installing and removing electrical connections.

The controller 46 is provided with processing means and memory means. The controller 46 is electrically connected to electronic unit fuel injectors 58 and delivers an electronic injection signal to the electronic unit fuel injectors 58 (best shown in FIG. 6). The controller 46 is provided with software which programs the controller 46 to improve the emissions performance of the engine 10. The electronic control module 46 is preferably programmed to provide multiple injection events 59 (combinations of pre-injection 59A, main injection 59B, post injection 59C) during a single combustion period to improve emissions performance. FIG. 7A illustrates a post injection %9C after a main injection 59B. The post-injection 59C causes a small amount of fuel to be injected into the cylinder 16 after the main injection 59B to optimize combustion through extended combustion cycles and resulting emissions reduction. FIG. 7B illustrates a pre-injection 59A prior to the main injection 59B. The pre-injection 59A causes a small amount of fuel to be injected into the cylinder 16 early in the combustion cycle to optimize combustion through peak firing pressure and emissions reduction. The injection events 59 during a single combustion period can be evaluated and applied at each engine operating point to achieve optimum emissions performance. Thus, the various engine operating points will utilize different injection events 59 including one or two pre-injections 59A with a main injection 59B and no post injections 59C, a main injection 59B with no pre-injections 59A or post injections 59C, a main injection 59B with one or two post injections 59C and no pre-injections 59A, or a main injection 59B with one or two pre-injections 59A and one or two post injections 59C. Various combinations of injection events 59 throughout the operating range of the engine 10 are determined to achieve the most effective emissions reduction while maintaining efficient engine operation for the specific engine 10 and the controller 46 is programmed accordingly.

Programming of the electronic control module 26 is customized for each engine operating point to achieve an improved emissions performance for a given duty-cycle. Locomotives have either switch duty-cycle for operating in local yards arranging cars for their primary purpose or line haul duty-cycle for operating across the country for long distance deliveries. Marine typically has power rating duty-cycles consisting of four operating points of varying speed and horsepower. Generators have fewer operating points. The EPA weights these operating points depending on the frequency of operation at a given point. Switch locomotives will spend the majority of their time in idle or lower notches compares to line haul locomotives which will spend the majority of their time in the maximum horsepower notches. The software is customized for the application by optimizing different run-points so that the weighted results achieve the desired emissions.

Figure 8:
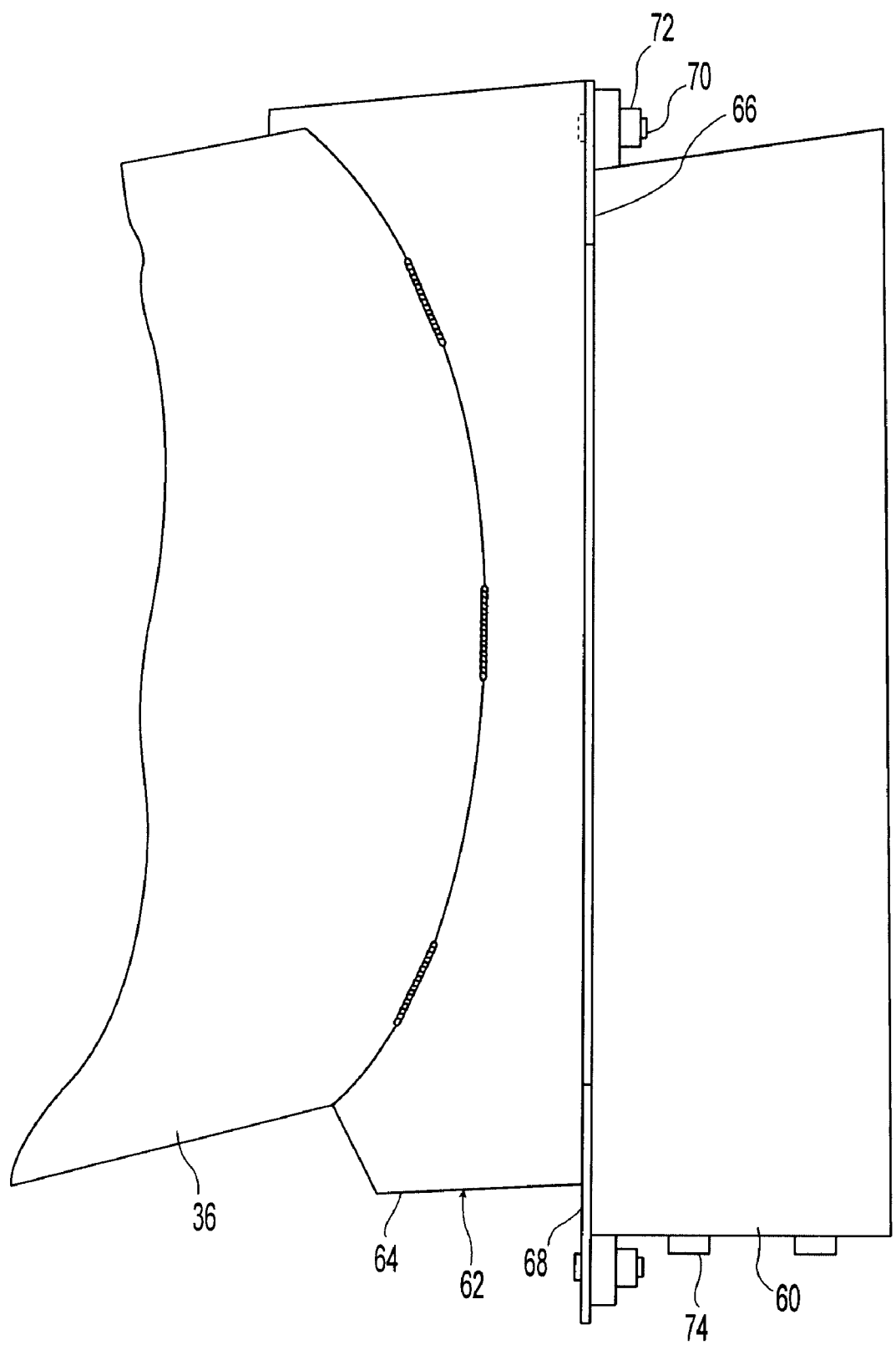
FIG. 8 is a fragmented, perspective view of an electronic governor box of the retrofitted engine of FIG. 2.
Figure 9:
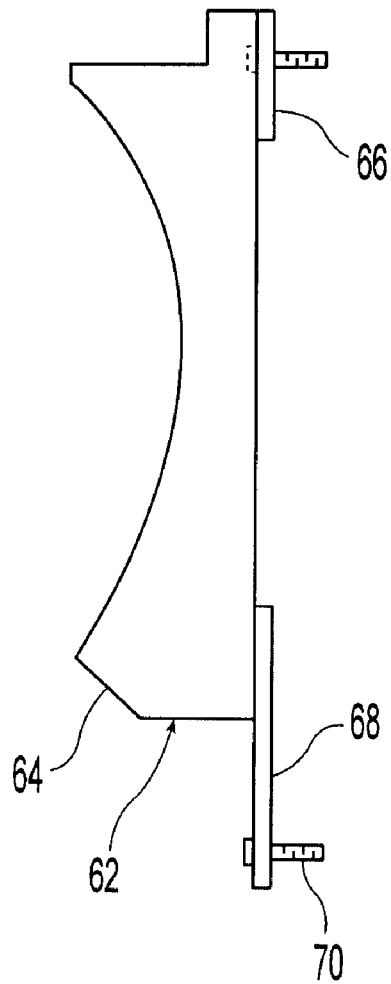
FIG. 9 is a side elevational view of a mounting bracket for the electronic governor box of FIG. 8.
Figure 10:
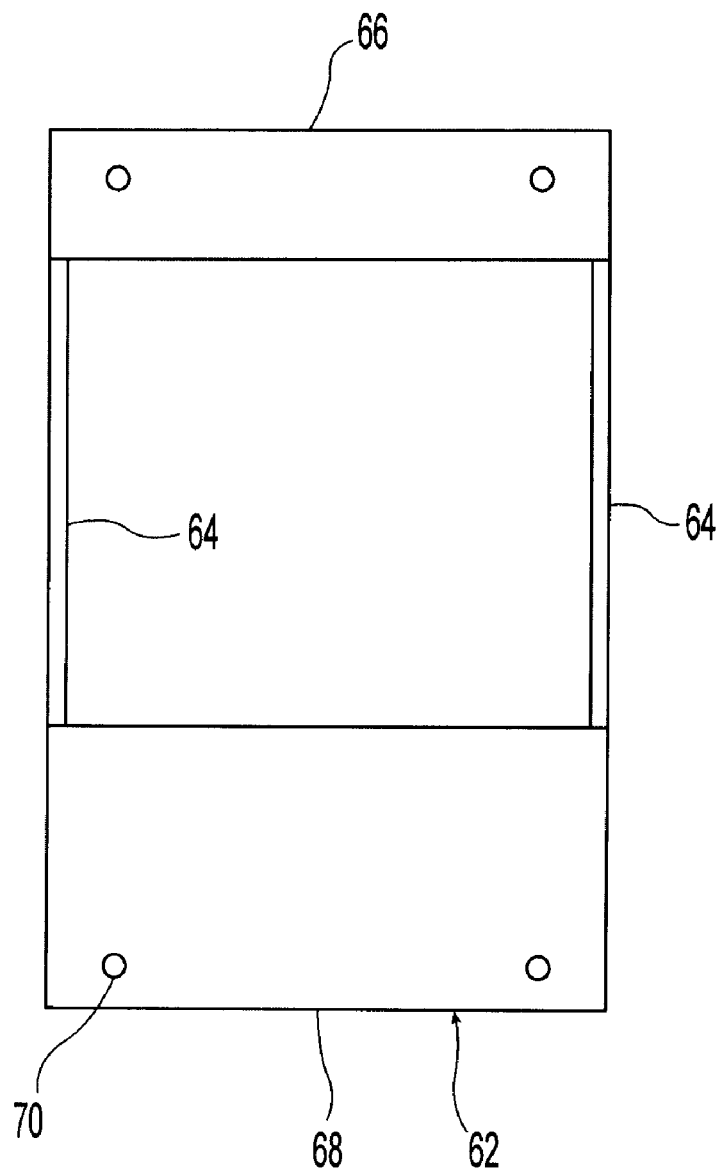
FIG. 10 is a front elevational view of the mounting bracket of FIG. 9.

As best shown in FIG. 8, an electronic governor box or module 60 is secured to the equipment rack 12. The illustrated electronic governor box 60 is installed directly to the coolant tank 36 on the equipment rack 12. To secure the governor box 60 to the coolant tank 36, a mounting bracket 62 having a radius substantially the same size as the coolant tank 36 is welded to the coolant tank 36. The governor box 60 is then removably attached to the mounting bracket 62. The illustrated mounting bracket 62 has two side panels 64 each with a radius substantially the same size as the coolant tank 36 and upper and lower braces 66, 68 extending between the side panels 64 (best shown in FIGS. 9 and 10). The side panels 64 and braces 66, 68 can be, for example, formed from 0.25 inch thick steel plates and welded together. The braces 66, 68 are provided with four threaded studs 70 which extend through mounting lugs of the governor box 60 and cooperate with threaded nuts 72 for removably attaching the governor box 60 to the mounting bracket 62 which is fixed to the coolant tank 36 and the equipment rack 12. It is noted that any other suitable attachment means can alternatively be utilized. The illustrated governor box 60 is mounted so that it faces the walkway between the engine 10 and the equipment rack 12. The illustrated governor box 60 is provided with electrical connectors 74 facing in a downward direction for ease of installing and removing electrical connections.

Figure 6:
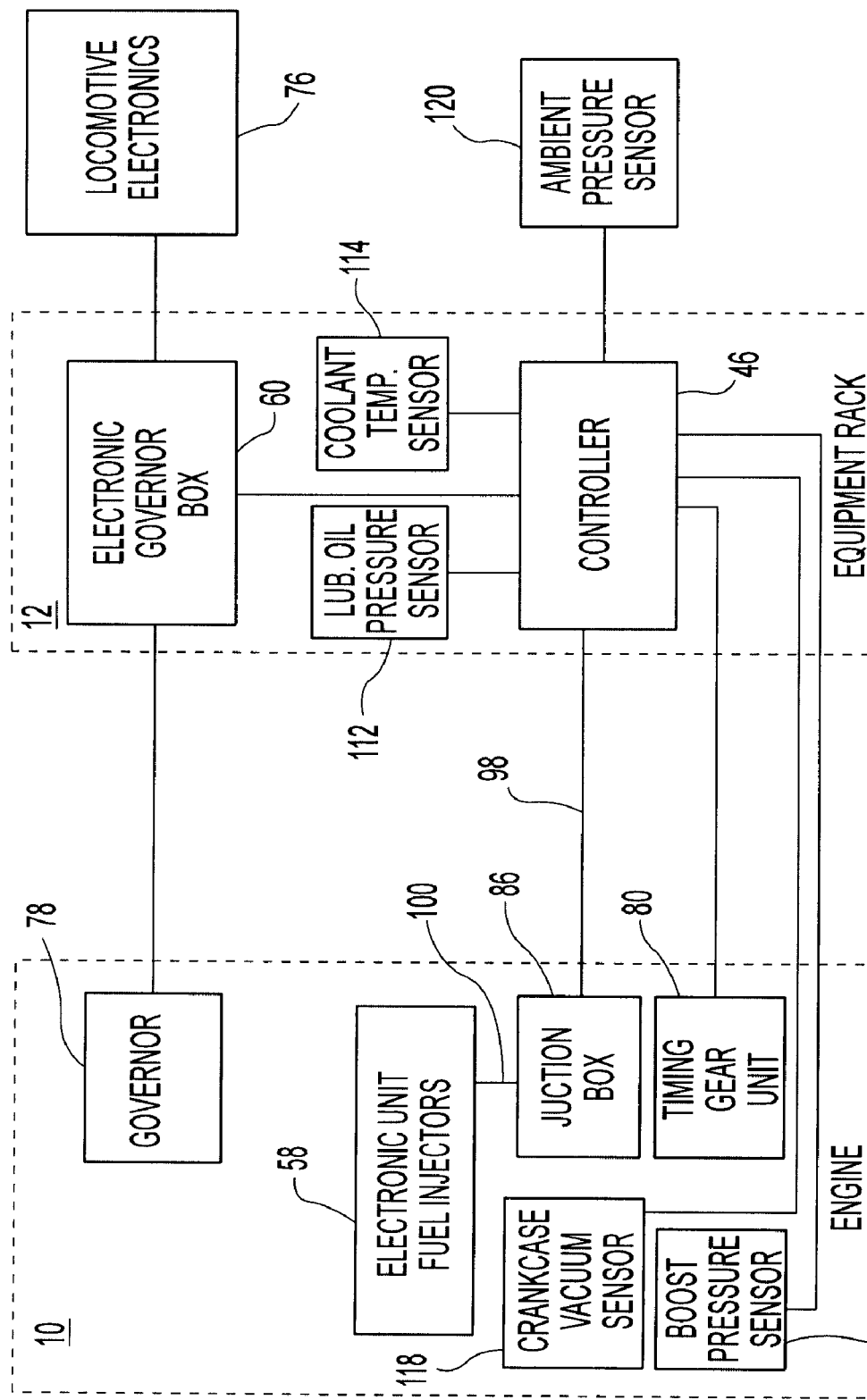
FIG. 6 is a diagrammatic view of electrical connections of the retrofitted engine of FIG. 2.
Figure 7B:
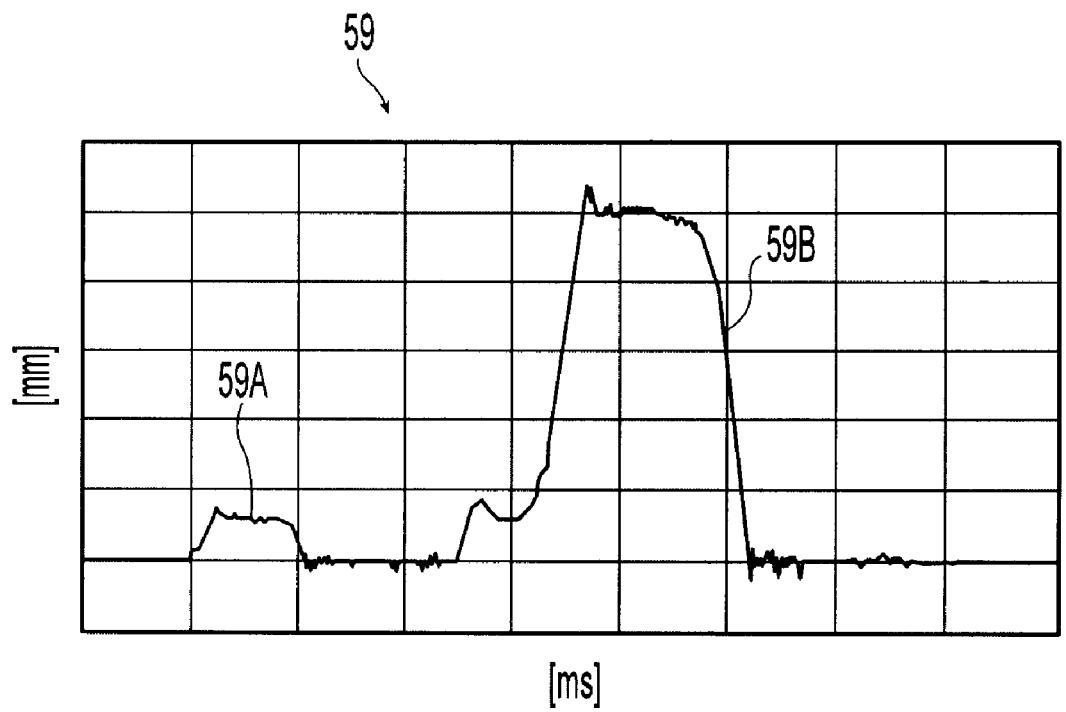
FIG. 7B is a graphical representation of alternative injection events for a combustion cycle of the retrofitted engine of FIG. 2.
Figure 7A:
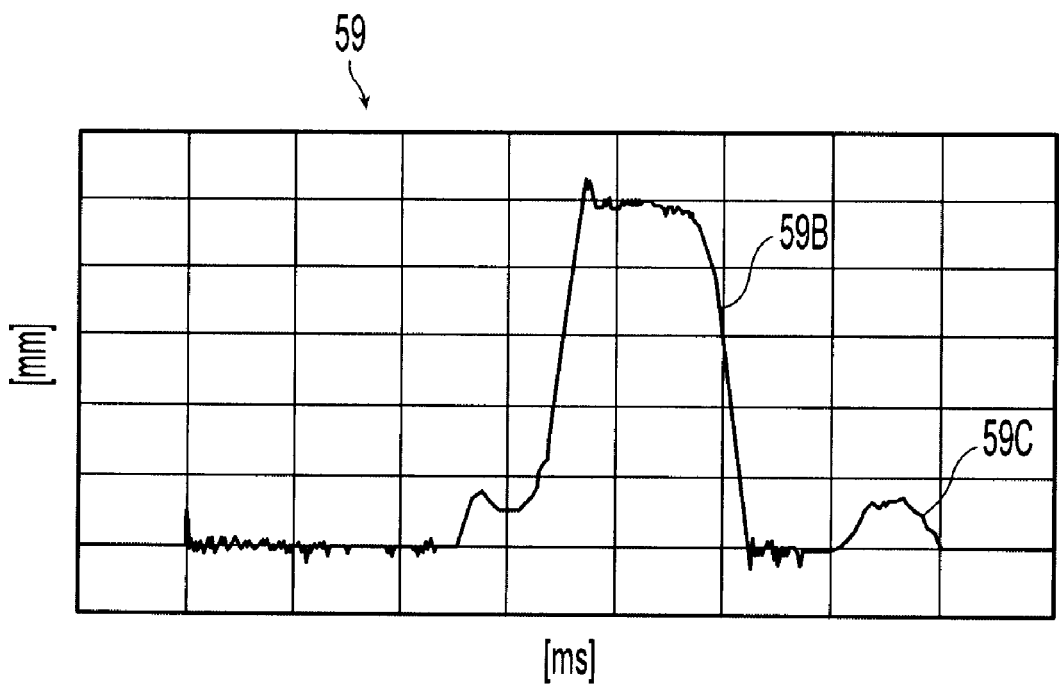
FIG. 7A is a graphical representation of injection events for a combustion cycle of the retrofitted engine of FIG. 2.

As best shown in FIG. 6, the electronic governor box 60 is electrically connected to the existing locomotive electronics 76 in order to replicate only the mechanical load regulator 26. The electronic control module 46 is electrically connected to the governor 78 through the electronic governor box 60 and determines excitation of the governor 78. As the governor 78 is excited, it creates resistance to determine horsepower. Fuel is supplied to maintain the given RPM based on the horsepower. Horsepower is determined by varying the excitation voltage and maintaining the RPM for a given excitation. For example, at idle there would be no excitation voltage since the only power is that required to keep the engine at speed. At full horsepower the excitation voltage would be at maximum to create the largest resistance on the engine.

Figure 12:
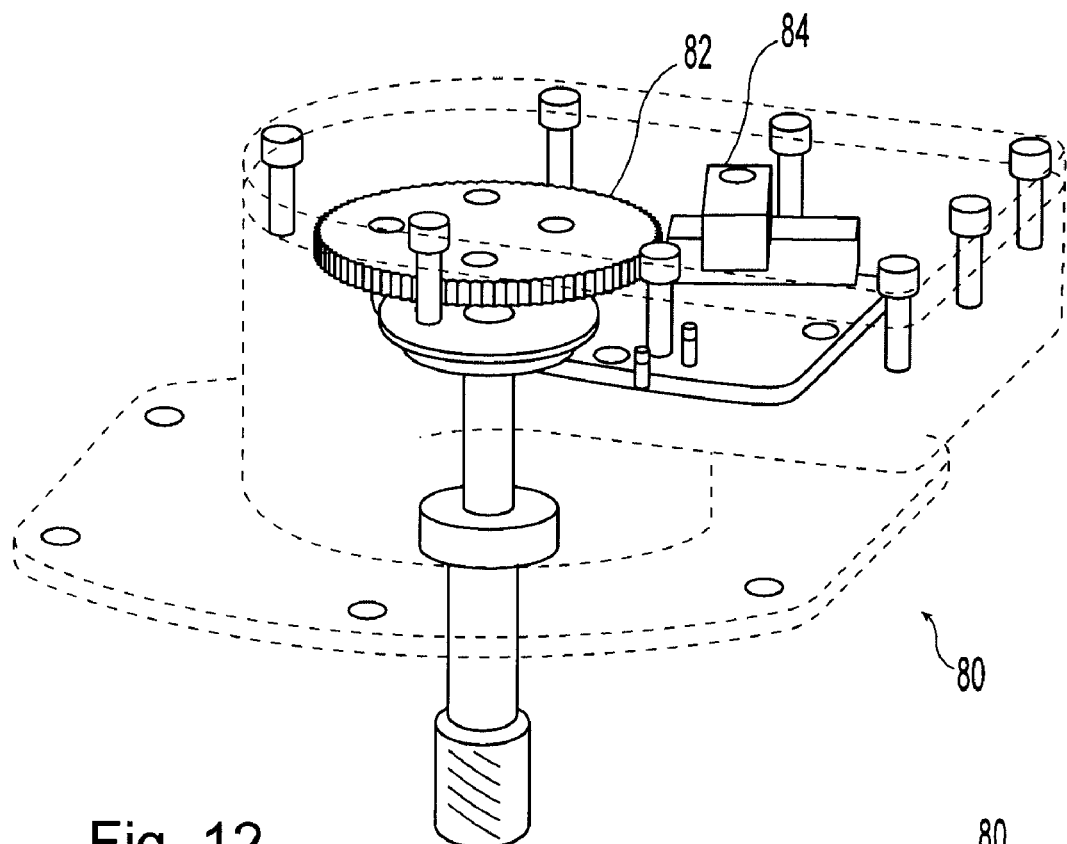
FIG. 12 is an exploded perspective view of the timing gear unit of FIG. 11.
Figure 11:
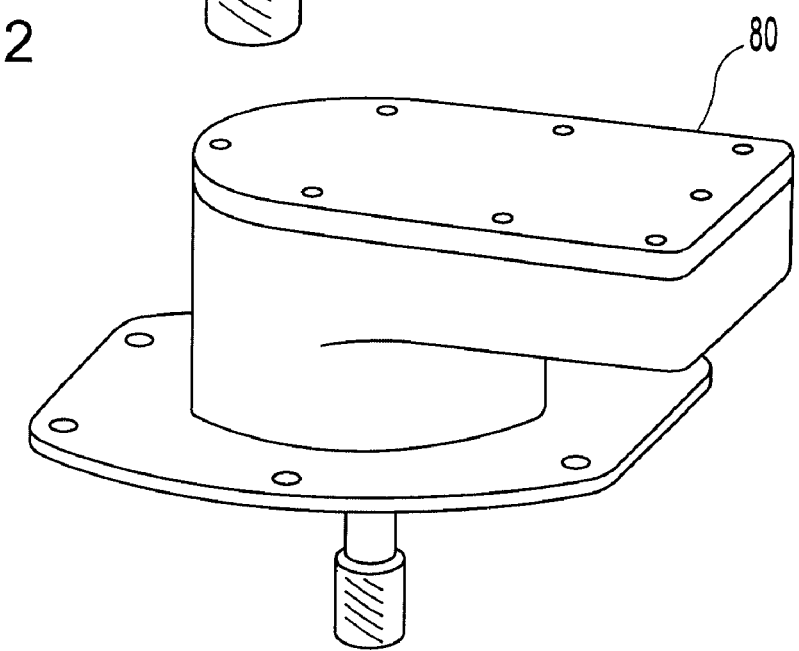
FIG. 11 is a perspective view of timing gear unit of the retrofitted engine of FIG. 2.

An angle drive replacement timing gear unit 80 is installed where the governor angle drive housing 44 was previously attached. The replacement timing gear unit 80 includes a timing gear 82 and speed sensors 84 mounted internal to the unit 80 (best shown in FIGS. 11 and 12). The illustrated replacement timing gear unit 80 is attached with bolts but any other suitable attachment means can alternatively be utilized. The sensors 84 are connected to the controller 46 to determine angular position and rotational speed. The electronic control module 46 is programmed to utilize a signal from the speed sensors 84 of the timing gear unit 80 for an indicator of engine angular position to be used for timing the fuel injection. Alternatively, the electronic fuel module 46 can programmed to utilize an engine flywheel for an indicator of engine angular position for fuel injection timing.

Figure 14:
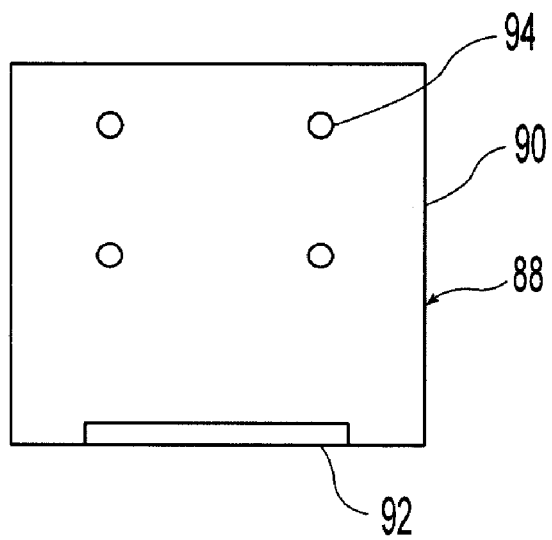
FIG. 14 is a front elevational view of the mounting bracket of FIG. 13.
Figure 15:
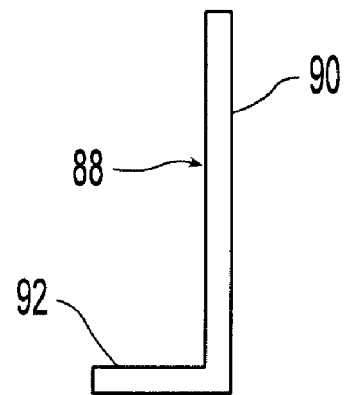
FIG. 15 is a side elevational view of the mounting bracket of FIGS. 13 and 14.
Figure 13:
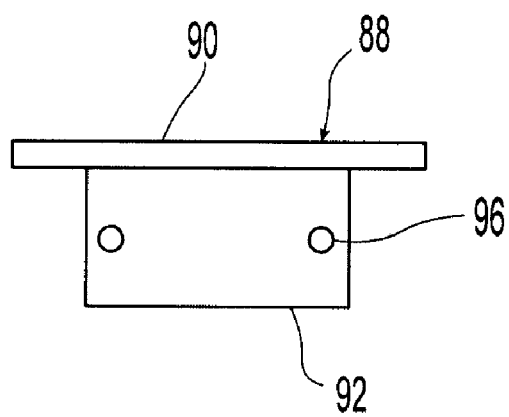
FIG. 13 is a top plan view of a mounting bracket for a junction box of the retrofitted engine of FIG. 2.

A fuel injector wiring junction box 86 is installed utilizing a mounting bracket 88 secured to the replacement timing gear unit 80. The illustrated mounting bracket 86 has a vertical main portion 90 and a horizontal bottom portion 92 perpendicularly extending from the lower end of the main portion 90 (best shown in FIGS. 13 to 15). The main portion 90 is provided with openings 94 for attachment of the wiring junction box 86 using bolts or other suitable fasteners. The bottom portion 92 is provided with openings 96 for attachment of the bottom portion 92 o the top of the timing gear unit 80 using bolts or other suitable fasteners. The mounting bracket 88 can be, for example, formed from 0.25 inch thick steel. The wiring junction box 86 can be of any suitable type for electrically connecting the wires 98 extending from the controller 46 with the wiring harness 48 extending from the electronic unit fuel injectors 58.

The unit electronic unit fuel injectors 58 are installed to the engine 10 in the locations where the mechanical fuel injectors 18 where removed. The electronic unit fuel injectors 58 are designed specifically for the type of engine 10 to which they are being installed. The electronic unit fuel injectors 58 preferably provide increased injection pressure and improved fuel atomization to improve emissions performance. Higher injection pressure can be used for better fuel atomization for less particulate matter creation during the combustion cycle and allows the timing to be retarded while still maintaining fuel economy.

The timing of the electronic unit fuel injectors 58 is set by moving the flywheel to the highest spot on the injector camshaft (the plunger of the injector will be depressed the maximum amount at this location). An adjuster screw on the rocker arm is then turned all the way down (fully depressing the plunger). Once the adjuster screw is bottomed out, it is reversed about 1.5 turns. Note that the highest spot on the injector camshaft may not match the timing plate for the engine 10 because it was originally designed for the mechanical fuel injectors 18. This is one possible method for setting the timing and other possible methods may be utilized to accomplish this task.

Figure 16:
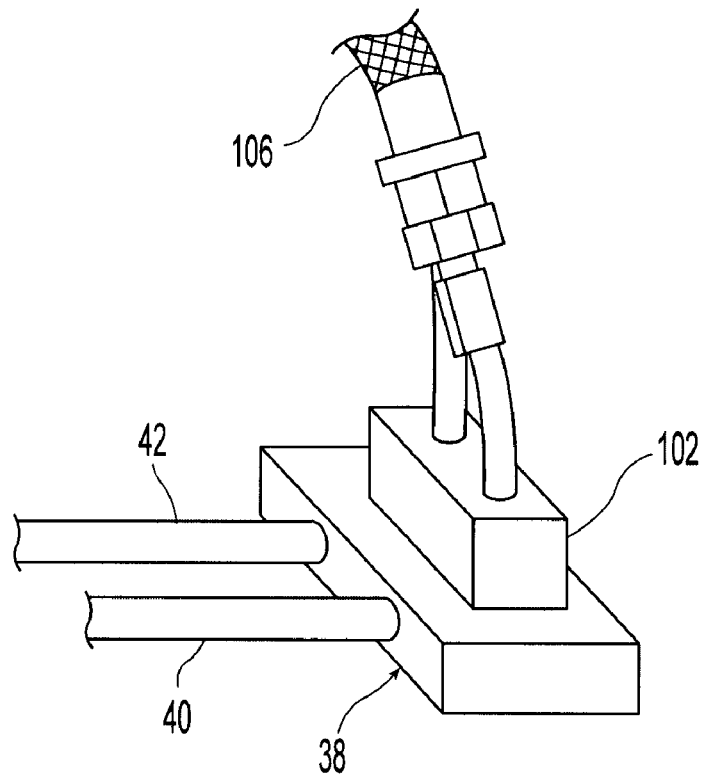
FIG. 16 is a perspective view of an adapter block connection of the retrofitted engine of FIG. 2.
Figure 17:
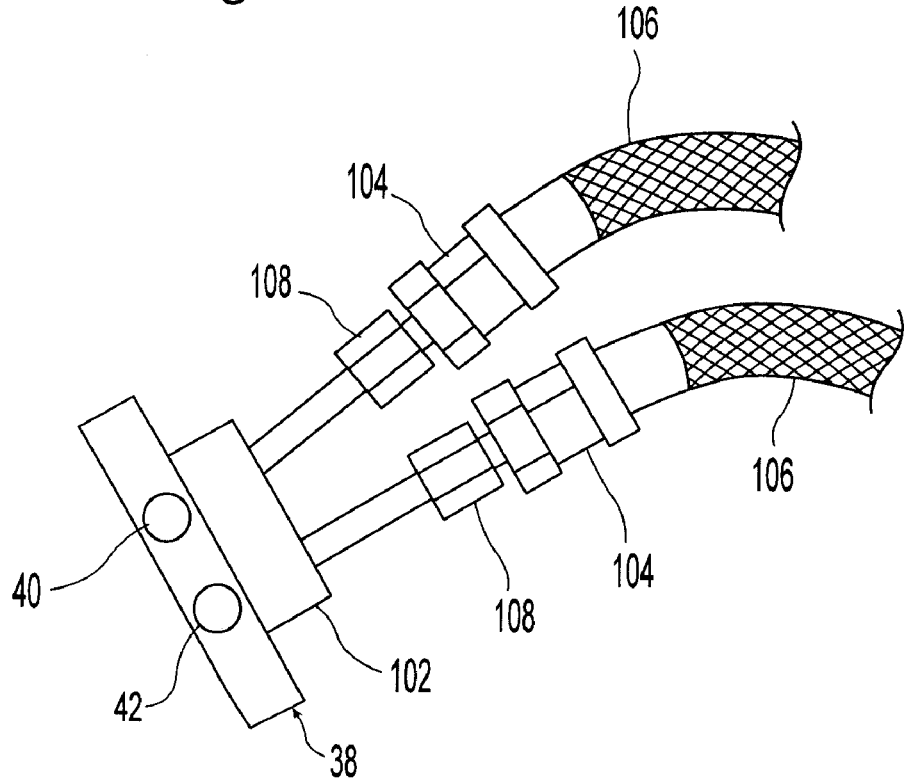
FIG. 17 is another perspective view of the adapter block connection of FIG. 16.

The electronic unit fuel injectors 58 are connected to the existing fuel manifold 38 which in turn is connected to the fuel pump 34 to supply fuel to the electronic unit fuel injectors 58. A first option for connecting the existing fuel manifold 38 is to attach an adapter block assembly 102 to the fuel manifold 38 which converts the existing fittings of the fuel manifold to threaded fittings for the electronic unit fuel injectors 58 (best shown in FIGS. 16 and 17). The adapter block assembly 102 is attached to the existing fuel manifold 38 using existing bolt and nut connections. Threaded connectors 104 of flexible inlet and outlet fuel lines 108 of the electronic unit fuel injector 58 is then secured to two threaded fittings 108 of the adapter block assembly 102 so that they are in communication with the fuel supply and fuel return lines 40, 42. A separate adapter block assembly 102 is secured to the fuel manifold 38 for each of the electronic unit fuel injectors 58. It is noted that the existing manifold assembly 38 is not modified and used as is.

Figure 18:
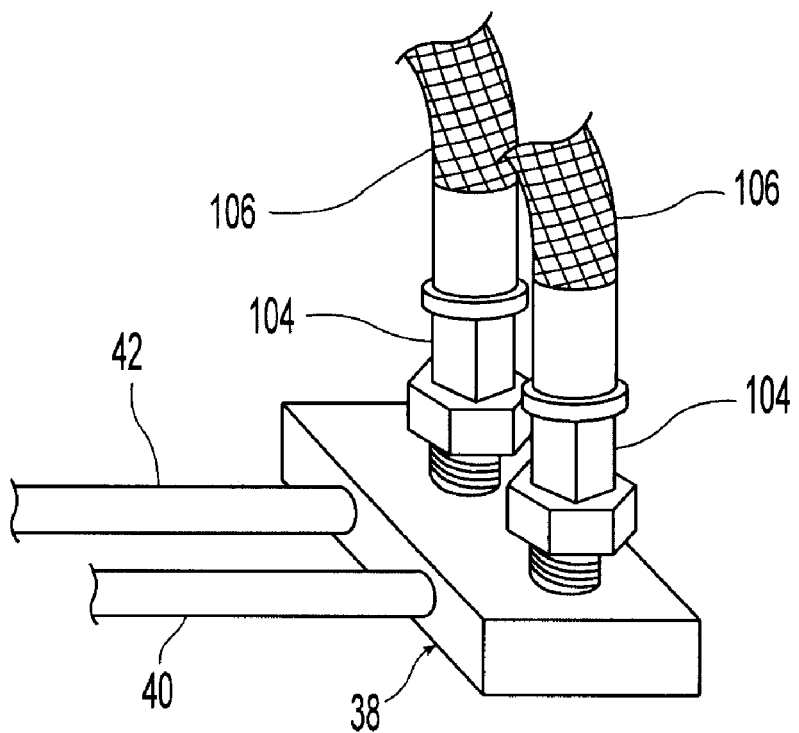
FIG. 18 is a perspective view of a direct fuel manifold connection of the retrofitted engine of FIG. 2.
Figure 19:
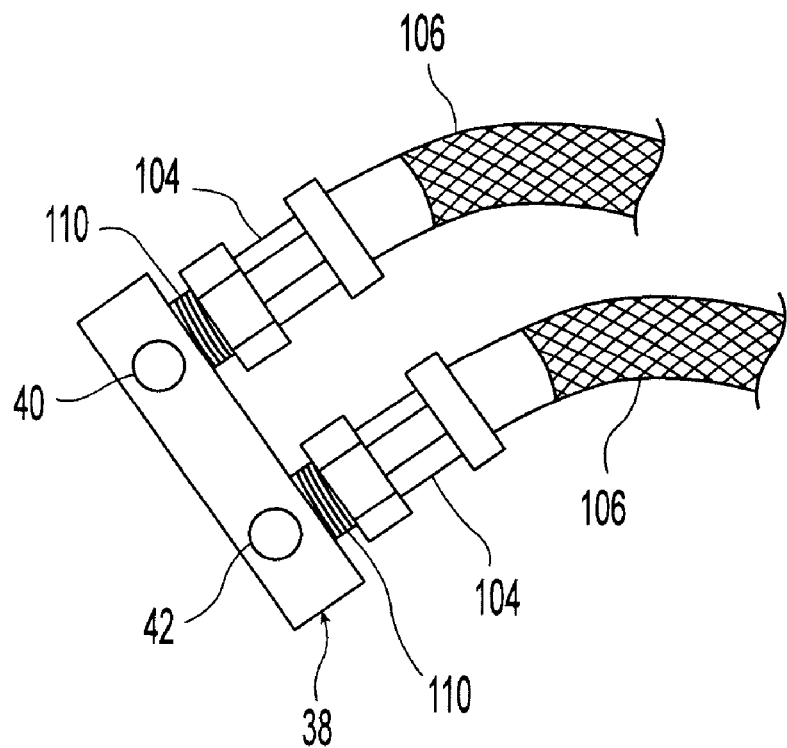
FIG. 19 is another perspective view of the connection of FIG. 18.

The second option for connecting the fuel manifold assembly 38 is to remove the existing fuel manifold header from the engine 10 and drill and tap holes in the manifold header that are sized for direct threaded connection of the connectors 104 of the inlet and outlet fuel lines 106 of the electronic unit fuel injectors 58 (best shown in FIGS. 18 and 19). The fuel manifold header is then reattached, threaded connectors 110 are directly threaded into the newly drilled and tapped holes, and the connectors 104 of the inlet and outlet fuel lines 106 of the electronic unit fuel injectors 58 are threaded onto the connectors 110. In this option, the existing manifold assembly 38 is modified to create a new threaded connection for the fuel lines 106 of the electronic unit fuel injectors 58.

A lubrication oil pressure sensor 112 is installed. The oil pressure sensor preferably has a range of about 0 to 200 PSI and an output signal of about 0 to 5 VDC, although other output signals and pressure ranges may be utilized to achieve the result. Supply voltage for the oil pressure sensor is supplied by the governor box 60. The oil pressure sensor 112 is electrically connected to provide the output signal to the electronic control module 46. The oil pressure sensor 112 is installed near the input for the existing analog gage so that electronic control module 46 receives a signal substantially similar to the readout so the operator sees on the analog gage.

A coolant temperature sensor 114 is installed. The coolant temperature sensor 114 preferably has a range of about 0 to 220 F and an output signal of about 4 to 20 mA, although other output signals and temperature ranges may be utilized to achieve the result. Supply voltage for the coolant temperature sensor 114 is supplied by the governor box 60. The coolant temperature sensor 114 is electrically connected to provide the output signal to the electronic control module 46. The coolant temperature sensor 114 is preferably installed where it will have a substantially matched reading as the existing fan controller sensor. The electronic control module 46 has the capability to operate the fans, if needed, so an input signal similar to the input signal the existing fan controller is desired. The electronic control module 46 can be programmed to change operation of the engine operation based on engine temperature. It is noted that while the illustrated embodiment utilized coolant temperature to represent engine temperature, oil temperature, engine block temperature, or some other form of measurement can alternatively be utilized to determine engine temperature. Preferably, engine operation is changed when the engine 10 first starts in cold weather. The electronic control module 46 can alter the fuel injection to protect the engine 10 until it reaches normal operating temperature where the normal injection will resume.

A boost pressure sensor 116 is optionally installed. The boost pressure sensor 116 preferably has a range of about 0 to 30 PSI and an output signal of about 4 to 20 mA, although other output signals and pressure ranges may be utilized to achieve the result. Supply voltage for the boost pressure sensor 116 is supplied by the governor box 60. The boost pressure sensor 116 is electrically connected to provide the output signal to the electronic control module 46. The boost pressure sensor 116 may be installed at the engine left side #1 end behind the water pump at the engine oil pressure valve, although other methods are available to achieve the result.

A crankcase vacuum sensor 118 is optionally installed. The crankcase pressure sensor 118 preferably has a range of about 0 to 30 PSI absolute and an output signal of about 4 to 20 mA, although other output signals and pressure ranges may be utilized to achieve the result. Supply voltage for the crankcase pressure switch 118 is supplied by the governor box 60. The crankcase pressure switch 118 is electrically connected to provide the output signal to the electronic control module 46. The crankcase pressure sensor 118 may be installed at the lower crankcase or engine protection device. The electronic control module 46 can be programmed to monitor the crankcase vacuum to protect the engine 10 as required.

An ambient pressure sensor 120 is optionally installed. The ambient pressure sensor 120 preferably has a range of about 0 to 30 PSI absolute and an output signal of about 4 to 20 mA, although other output signals and pressure ranges may be utilized to achieve the result. Supply voltage for the ambient pressure sensor 120 is supplied by the governor box 60. The ambient pressure sensor 120 is electrically connected to provide the output signal to the electronic control module 46. The ambient pressure sensor 120 may be installed in the locomotive where it can measure ambient pressure. The electronic control module 46 can be programmed to change operation of the engine 10 based on altitude, which is related to ambient pressure, to enhance emissions performance at varying altitudes. These changes may include horsepower alteration, injection operation, and engine operation modifications.

Finally, the fuel injector wiring harness 100 is installed between the electronic unit fuel injectors 58 and the junction box 86. The junction box 86 in turn is electrically connected to the electronic control unit 46.

The retrofitted engine 10 preferably includes at least one power assembly component that has reduced oil consumption to enhance emissions performance. The majority of particulate matter is from lube oil versus diesel fuel. In order to achieve the low PM requirements it is beneficial to reduce the oil consumption within the engine. One method for achieving this is to modify the piston ring configuration to better control the oil. Reducing the amount of oil that is able to bypass the piston rings and eventually enter the exhaust has significant impact on PM reduction. Other options may include valve guide seal configurations, honing tolerances/patterns, etc.

A kit for reducing exhaust emissions from an existing EMD 567/645 two-cycle diesel engine 10 by retrofitting the engine 10 from mechanical fuel injection to electronic fuel injection can comprise a plurality of electronic unit fuel injectors 58 and an electronic control module 46 to be electrically connected to the electronic unit fuel injectors 58 for delivering electronic injection signals to the electronic unit fuel injectors 58 and programmed for operating the electronic unit fuel injectors 58 to improve emissions performance of the EMD 567/645 two cycle diesel engine 10.

From the foregoing disclosure and detailed description of certain preferred embodiments, it is apparent that the illustrated system and method extends the useful life of EMD 567/645 two-cycle diesel engines 10 without requiring an expensive overhaul or new replacement engine. It is also apparent that this unique retrofit strategy is relatively low cost, is relatively easy to apply, and provides enhanced emissions performance. It is believed that this system and method enables EMD 567/645 two-cycle diesel engines 10 to meet at least US EPA locomotive Tier 2 standards.

From the foregoing disclosure and detailed description of certain preferred embodiments, it is also apparent that various modifications, additions and other alternative embodiments are possible without departing from the true scope and spirit of the present invention. The embodiments discussed were chosen and described to provide the best illustration of the principles of the present invention and its practical application to thereby enable one of ordinary skill in the art to utilize the invention in various embodiments and with various modifications as are suited to the particular use contemplated. All such modifications and variations are within the scope of the present invention as determined by the appended claims when interpreted in accordance with the benefit to which they are fairly, legally, and equitably entitled.

What is claimed is:

1. A kit for reducing exhaust emissions from an existing EMD 567/645 two-cycle diesel engine by retrofitting the engine from mechanical fuel injection to electronic fuel injection, the kit comprising:

a plurality of electronic unit fuel injectors for installation in the engine at locations where preexisting mechanical fuel injectors were removed from the engine;

an electronic control module to be electrically connected to the electronic unit fuel injectors for delivering electronic injection signals to the electronic unit fuel injectors;

connectors for connecting fuel lines of the electronic unit fuel injectors to a preexisting fuel manifold of the engine from which the mechanical fuel injectors were removed;

an angle-drive-replacement timing gear unit adapted for attachment on the engine at a location where a preexisting governor angle drive was removed from the engine and having a timing gear driven like the governor angle drive by the engine and a sensor for sensing angular position and speed of the timing gear;

wherein the sensor of the timing gear unit is connectable to the electronic control module and the electronic control module is programmed to utilize a signal from the sensor of the timing gear unit to indicate an angular position to be used in timing fuel injection by the electronic unit fuel injectors; and wherein the electronic control module is programmed for operating the electronic unit fuel injectors to improve emissions performance of the EMD 567/645 two cycle diesel engine and meet EPA locomotive Tier 2 emission standards.

2. The kit as claimed in claim 1, wherein the unit electronic fuel injectors provide increased injection pressure and improved fuel atomization to improve emissions performance.

3. The kit as in claimed in claim 1, wherein the electronic control module is programmed to provide multiple injection events during a single combustion period to improve emissions performance.

4. The kit as claimed in claim 3, wherein the multiple injection events during a single combustion period is evaluated and applied at each engine operating point to achieve optimum emissions performance.

5. The kit as claimed in claim 1, wherein the electronic control module is electrically connected to a governor and determines excitation of the governor.

6. The kit as claimed in claim 1, wherein the electronic control module provides the option to automatically start and stop the engine to reduce idle operation and resulting emissions.

7. The kit as claimed in claim 1, wherein the engine includes at least one power assembly component that has reduced oil consumption to enhance emissions performance.

8. The kit as claimed in claim 1, further comprising an absolute pressure sensor and wherein the electronic control module is programmed to change operation of the engine based on altitude to enhance emissions performance at varying altitudes.

9. The kit as claimed in claim 1, further comprising a temperature sensor and wherein the electronic control module is programmed to change operation of the engine operation based on engine temperature.

10. The kit as claimed in claim 1, wherein the connectors have externally-threaded portions for threading into newly formed internally-threaded openings in the preexisting fuel manifold of the engine and have threaded connections for threaded connection with the fuel lines of the electronic unit fuel injectors.

11. The kit as claimed in claim 1, wherein the connectors include manifold-block adapters configured for connection to preexisting bolt connections of the preexisting fuel manifold of the engine from which the mechanical fuel injectors were removed and have threaded connections for threaded connection with the fuel lines of the electronic unit fuel injectors so that the preexisting bolt connections of the fuel manifold remain unmodified.

12. The kit as claimed in claim 1, wherein the electronic unit fuel injectors have a nozzle which improves combustion for enhanced emissions performance.

13. A method for retrofitting an EMD 567/645 two-cycle diesel engine to reduce exhaust emissions, the method comprising the steps of:
(a) removing a mechanical governor, rack, and associated linkage from the engine;
(b) removing mechanical fuel injectors from the engine;
(c) removing an over speed trip linkage and lay shaft assembly from the engine;
(d) removing a governor angle drive housing from the engine;
(e) removing a mechanical load regulator;
(f) installing an engine electronic control module programmed for operating the electronic unit fuel injectors to improve emissions performance of the EMD 567/645 two cycle diesel engine and meet EPA locomotive Tier 2 emission standards;
(g) installing a plurality of electronic unit fuel injectors on the engine at locations where the mechanical fuel injectors were removed from the engine;
(h) connecting fuel lines of the electronic unit fuel injectors to a preexisting fuel manifold of the engine from which the mechanical fuel injectors were removed;
(i) installing a fuel injector wiring harness of the electronic unit fuel injectors to electrically connect the electronic unit fuel injectors to the electronic control unit;
installing an angle-drive-replacement timing gear unit on the engine at a location where a preexisting governor angle drive housing was removed from the engine so that a timing gear of the timing gear unit is driven by the engine like the removed governor angle drive, the timing gear unit having a sensor for sensing angular position and speed of the timing gear; and
electrically connecting the sensor of the timing gear unit to the electronic control module so that the electronic control module so that electronic control module utilizes a signal from the sensor of the timing gear unit to indicate an angular position to be used in timing fuel injection by the electronic unit fuel injectors.

14. The method as claimed in claim 13, further comprising the step of installing an engine governor control module.

15. The method as claimed in claim 13, further comprising the step of installing a lubrication oil pressure sensor on the engine, installing a coolant temperature sensor on the engine and in communication with the electronic control module, installing an absolute pressure sensor on the engine and in communication with the electronic control module, installing a boost pressure sensor on the engine and in communication with the electronic control module.

16. The method as claimed in claim 13, wherein the step of connecting fuel lines of the electronic unit fuel injectors to a preexisting fuel manifold of the engine includes the steps of removing a header of the preexisting fuel manifold from the engine, drilling and tapping internally-threaded holes in the header of the preexisting fuel manifold of the engine while it is removed from the engine, reinstalling the header on to the engine, and threading connectors having threaded connections for the fuel lines of the electronic unit fuel injectors into the internally-threaded holes.

17. The method as claimed in claim 13, wherein the step of connecting fuel lines of the electronic unit fuel injectors to a preexisting fuel manifold of the engine includes the steps of attaching manifold-block adapters to preexisting bolt connections of the preexisting fuel manifold of the engine from which the mechanical fuel injectors were removed, and attaching the fuel lines of the electronic unit fuel injectors to threaded connections of the manifold-block adapters so that the preexisting fuel manifold remains unmodified.

* * * * *